United States Patent
Zhang et al.

(10) Patent No.: US 8,978,240 B2
(45) Date of Patent: Mar. 17, 2015

(54) METHOD OF FORMING A SPIN VALVE STRUCTURE WITH A COMPOSITE SPACER IN A MAGNETIC READ HEAD

(75) Inventors: Kunliang Zhang, Milpitas, CA (US); Min Li, Dublin, CA (US); Moris Dovek, Milpitas, CA (US); Yue Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 54 days.

(21) Appl. No.: 13/200,013

(22) Filed: Sep. 15, 2011

(65) Prior Publication Data

US 2012/0009337 A1   Jan. 12, 2012

Related U.S. Application Data

(62) Division of application No. 11/803,057, filed on May 11, 2007, now Pat. No. 8,031,441.

(51) Int. Cl.
*G11B 5/127* (2006.01)
*H04R 31/00* (2006.01)
(Continued)

(52) U.S. Cl.
CPC ............... *G11B 5/3909* (2013.01); *B82Y 10/00* (2013.01); *B82Y 25/00* (2013.01); *G11B 5/3906* (2013.01); *G11B 2005/3996* (2013.01)
USPC .................. 29/603.14; 29/603.11; 29/603.13; 360/324.1; 360/324.11; 360/324.12; 360/324.2; 427/127; 427/128

(58) Field of Classification Search
USPC ............... 29/603.07, 603.13–603.16, 603.18; 360/324.1, 324.2, 324.11, 324.12; 427/127–131
See application file for complete search history.

(56) References Cited

U.S. PATENT DOCUMENTS 5,627,704 A    5/1997  Lederman et al.
5,668,688 A    9/1997  Dykes et al.
(Continued)

FOREIGN PATENT DOCUMENTS

JP    2002-208744    7/2002
JP    2003-008102    1/2003
(Continued)

OTHER PUBLICATIONS

"MgO-Based Tunnel Junction Material for High-Speed Toggle Magnetic Random Access Memory," by Renu W. Dave et al., IEEE Transactions on Magnetics, vol. 42, No. 8, Aug. 2006, pp. 1935-1939.
(Continued)

*Primary Examiner* — Paul D Kim
(74) *Attorney, Agent, or Firm* — Saile Ackerman LLC; Stephen B. Ackerman

(57) ABSTRACT

A CPP-GMR spin valve having a composite spacer layer comprised of at least one metal (M) layer and at least one semiconductor or semi-metal (S) layer is disclosed. The composite spacer may have a M/S, S/M, M/S/M, S/M/S, M/S/M/S/M, or a multilayer $(M/S/M)_n$ configuration where n is an integer $\geq 1$. The pinned layer preferably has an AP2/coupling/AP1 configuration wherein the AP2 portion is a FCC trilayer represented by $Co_zFe_{(100-Z)}/Fe_yCo_{(100-y)}/Co_zFe_{(100-Z)}$ where y is 0 to 60 atomic %, and z is 75 to 100 atomic %. In one embodiment, M is Cu with a thickness from 0.5 to 50 Angstroms and S is ZnO with a thickness of 1 to 50 Angstroms. The S layer may be doped with one or more elements. The dR/R ratio of the spin valve is increased to 10% or greater while maintaining acceptable EM and RA performance.

9 Claims, 1 Drawing Sheet

(51) Int. Cl.
*G11B 5/39* (2006.01)
*B82Y 10/00* (2011.01)
*B82Y 25/00* (2011.01)

(56) References Cited

U.S. PATENT DOCUMENTS

| | | | |
|---|---|---|---|
| 5,715,121 | A | 2/1998 | Sakakima et al. |
| 5,893,981 | A * | 4/1999 | Dovek et al. ............... 216/22 |
| 5,992,004 | A * | 11/1999 | Sato et al. ............... 29/603.14 |
| 6,583,970 | B1 * | 6/2003 | Sakata ............... 360/324.12 |
| 6,775,903 | B2 * | 8/2004 | Horng et al. ............... 29/603.14 |
| 6,870,711 | B1 * | 3/2005 | Zhao et al. ............... 428/828 |
| 6,876,523 | B2 | 4/2005 | Takahashi et al. |
| 6,917,088 | B2 | 7/2005 | Takahashi et al. |
| 6,972,934 | B2 * | 12/2005 | Horng et al. ............... 360/324.11 |
| 7,116,529 | B2 | 10/2006 | Yoshikawa et al. |
| 7,381,480 | B2 | 6/2008 | Nakamura et al. |
| 7,525,772 | B2 | 4/2009 | Koui et al. |
| 7,583,481 | B2 * | 9/2009 | Zhang et al. ............. 360/324.11 |
| 7,672,088 | B2 * | 3/2010 | Zhang et al. ............. 360/324.11 |
| 7,885,042 | B2 * | 2/2011 | Shimazawa et al. ....... 360/324.2 |
| 7,918,014 | B2 | 4/2011 | Zhang et al. |
| 2007/0297103 | A1 * | 12/2007 | Zhang et al. ............. 360/324.12 |

FOREIGN PATENT DOCUMENTS

| | | |
|---|---|---|
| JP | 2006-080144 | 3/2006 |
| JP | 2007-088483 | 4/2007 |

OTHER PUBLICATIONS

"The scalability of CPP-GMR heads toward over 100Gbpsi, compared with TMR heads," by M. Takagishi et al., Toshiba TMRC 2001, 10 pgs.

Japanese Office Action 2008-124797, Mail date—Dec. 11, 2012, Headway Technologies Inc.

* cited by examiner

METHOD OF FORMING A SPIN VALVE STRUCTURE WITH A COMPOSITE SPACER IN A MAGNETIC READ HEAD

This is a Divisional application of U.S. patent application Ser. No. 11/803,057, filed on May 11, 2007 now U.S. Pat. No. 8,031,441, which is herein incorporated by reference in its entirety, and assigned to a common assignee.

RELATED PATENT APPLICATION

This application is related to the following: Ser. No. 11/180,808, filing date Jul. 13, 2005; and Ser. No. 11/234,719, filing date Sep. 23, 2005; both assigned to a common assignee, both of which are herein incorporated by reference in their entirety.

FIELD OF THE INVENTION

The invention relates to a spacer layer for use in a giant magnetoresistive (GMR) sensor in a current perpendicular to plane (CPP) magnetic read head and in particular to a composite spacer comprised of at least one metal layer and one semiconductor or semi-metal layer that provides an improved magnetoresistive (MR) ratio.

BACKGROUND OF THE INVENTION

A magnetic disk drive includes circular data tracks on a rotating magnetic disk and read and write heads that may form a merged head attached to a slider on a positioning arm. During a read or write operation, the merged head is suspended over the magnetic disk on an air bearing surface (ABS). The sensor in a read head is a critical component since it is used to detect magnetic field signals by a resistance change. The resistance change is produced by a giant magnetoresistance (GMR) effect which is based on a configuration in which two ferromagnetic layers are separated by a non-magnetic conductive layer in the sensor stack. One of the ferromagnetic layers is a pinned layer in which the magnetization direction is fixed by exchange coupling with an adjacent anti-ferromagnetic (AFM) or pinning layer. The second ferromagnetic layer is a free layer in which the magnetization vector can rotate in response to external magnetic fields. The rotation of magnetization in the free layer relative to the fixed layer magnetization generates a resistance change that is detected as a voltage change when a sense current is passed through the structure. In a CPP configuration, a sense current is passed through the sensor in a direction perpendicular to the layers in the stack. Alternatively, there is a current-in-plane (CIP) configuration where the sense current passes through the sensor in a direction parallel to the planes of the layers in the sensor stack. The CPP GMR head design has been previously disclosed in U.S. Pat. Nos. 5,627,704 and 5,668,688.

A CPP GMR head is considered to be a promising candidate for >200 Gb/in$^2$ recording density. The CPP configuration is more desirable for ultra-high density applications because a stronger output signal is achieved as the sensor size decreases, and the magnetoresistive (MR) ratio is higher than for a CIP configuration. Both CPP and CIP GMR heads may take advantage of a CoFe/NiFe composite free layer for improved performance. In the CPP GMR head structure, a bottom spin valve film stack is generally employed for biasing reasons as opposed to a top spin valve where the free layer is below a copper spacer and the pinned layer is above the copper spacer.

An important characteristic of a GMR head is the MR ratio which is dR/R where dR is the change in resistance of the spin valve sensor and R is the resistance of the spin valve sensor before the change. A higher MR ratio is desired for improved sensitivity in the device and this result is achieved when electrons in the sense current spend more time within the magnetically active layers of the sensor. Interfacial scattering which is the specular reflection of electrons at the interfaces between layers in the sensor stack can improve the MR ratio and increase sensitivity. Unfortunately, the MR ratio is often very low (<5%) in many CPP-GMR spin valve structures involving metal spacers. A MR ratio of ≥10% and an RA of <0.5 ohm-um$^2$ are desirable for advanced applications.

A synthetic anti-parallel (SyAP) pinned layer configuration represented by AP2/coupling/AP1 is preferred over a single pinned layer because a smaller net magnetic moment is possible for a SyAP layer and that means greater exchange coupling between the AFM layer and adjacent AP2 layer. It is also known in the art that a laminated AP1 layer made of alternating CoFe and thin Cu layers can improve the MR ratio in CPP-GMR heads as described by M. Takagishi (Toshiba) in a TMRC2001 presentation. An example of a CPP-GMR bottom spin valve structure is represented by a seed/AFM/pinned/spacer/free/cap configuration where seed is a seed layer, the pinned layer has a [AP2/coupling/AP1] SyAP configuration in which Ru may be the coupling layer and [CoFe/Cu/CoFe] is the laminated AP1 layer, and the free layer is a CoFe/NiFe composite. AP1 and AP2 thickness is typically in the range of 20 to 50 Angstroms and the free layer thickness is from 30 to 60 Angstroms. For read head applications, the free layer preferably has a small coercivity (Hc) of less than 10 Oersted (Oe) and a low magnetostriction on the order of 10$^{-8}$ to low 10$^{-6}$ values to reduce stress induced anisotropy.

Another important consideration for CPP-GMR read heads is electromigration (EM) performance. For CPP spin valve structures having an AP2/coupling/AP1 pinned layer configuration, Fe rich CoFe alloys such as Fe$_{50}$Co$_{50}$ or Fe$_{70}$Co$_{30}$ in the AP1 layer are known to be effective in enhancing the MR ratio. However, Fe rich CoFe alloys may cause EM performance degradation. Therefore, it is important to control EM performance through proper choice of the spacer layer and AP2 layer.

CPP GMR head performance can be improved by employing a confining current path (CCP) in a copper spacer through means of segregating metal path and oxide formation as described in U.S. Pat. No. 5,715,121. A CCP Cu spacer structure can be represented as [Cu/CCP layer/Cu] where the CCP layer may be formed by co-depositing Al$_2$O$_3$ and Cu, for example. Another example of a confining path spacer is described in U.S. Patent Application 2006/0209472 where a columnar metal path penetrates an insulating portion vertically and the insulating portion comprises over 50% of the spacer. Although the MR ratio is relatively large for a CCP-CPP scheme, the uniformity and EM are two major obstacles that require development before the CCP technology can be incorporated in a product.

In U.S. Pat. No. 7,116,529, a non-magnetic spacer is disclosed that has a Cu/AlCuO/Cu stacked structure to provide a current confinement effect. The oxide portion is between 5 and 50 Angstroms thick.

U.S. Pat. No. 6,876,523 describes a spacer made of a noble metal such as Pt, Pd, Rh, Ru, Ir, Au, or Ag to achieve an improved MR ratio compared to a Cu spacer.

In U.S. Pat. No. 6,917,088, a Au spacer is replaced by an oxide semiconductor spacer having d-electrons at the Fermi surface. Two examples are SrTiO as a perovskite type oxide and TiO$_2$ as a rutile type oxide.

U.S. Patent Application 2006/0060901 teaches a spacer layer made of a low resistance material (Cu, Au, Ag, Al) or a high resistance material which is an insulator made of an oxide, nitride, or fluoride of Al, Ti, Ta, Co, Ni, Si, Mg, or Fe.

SUMMARY OF THE INVENTION

One objective of the present invention is to provide a CPP-GMR spin valve having a composite spacer layer comprised of a metal and a semiconductor or semi-metal that improves the MR ratio compared to prior art magnetic read heads.

A further objective of the present invention is to employ a full film structure in the composite spacer layer according to the first objective in order to ensure acceptable uniformity and EM performance.

These objectives are achieved in one embodiment in which a sensor comprised of a bottom CPP-GMR spin valve configuration is formed in a magnetic read head. The sensor element may be formed on a substrate that is a bottom magnetic shield (S1), for example, and is comprised of a seed layer, AFM layer, pinned layer, composite spacer, free layer, and cap layer which are sequentially formed on the substrate. The pinned layer may have a SyAP (AP2/coupling/AP1) configuration in which the AP2 layer is a FCC like trilayer with a composition represented by $Co_zFe_{(100-z)}/Co_yFe_{(100-y)}/Co_zFe_{(100-z)}$ where y is 0 to 60 atomic %, and z is 75 to 100 atomic %. The coupling layer is one of Ru, Rh, or Ir and the AP1 layer is preferably a laminated film comprised of CoFe and Cu layers with a $[CoFe/Cu]_n/CoFe$ configuration where n is 2 or 3. The free layer may be a composite layer comprised of $Co_sFe_{(100-s)}/CoFeB/NiFe$ where s is from 0 to 100 atomic %. A key feature is a composite spacer layer that of has at least one metal (M) layer and at least one semiconductor or semi-metal (S) layer.

In one embodiment where M is Cu and S is ZnO, the composite spacer is made of at least one Cu layer and at least one ZnO layer and has a Cu/ZnO or ZnO/Cu configuration. In a second embodiment, the composite spacer has a plurality of alternating Cu and ZnO layers as in Cu/ZnO/Cu or Cu/ZnO/Cu/ZnO/Cu configurations. Optionally, the composite spacer layer may be a multilayer structure having a $[Cu/ZnO/Cu]_n$ configuration where n is an integer≥1. Furthermore, one or more of the ZnO layers may be doped with Si, B, Mg, Mn, Al, Cu, Cd, Cr, Ti, Zr, Hf, Ru, Mo, Nb, Co, Fe, Ni, or other elements to improve spin valve performance, possibly by helping to control grain boundaries within the semiconductor (ZnO) layer.

In another set of embodiments, one or more of the ZnO layers in the aforementioned embodiments may be replaced by MgO or other semiconductor materials such as $Zn_xMg_{(100-x)}O$ where x is from 0 to 99 atomic %, ZnCuO, ZnCdO, ZnAlO, ZnSe, ZnTe, Si, Ge, $TiO_2$, AlN, GaN, InN, AlP, AlAs, AlSb, GaP, GaAs, GaSb, InP, InAs, ZnS, CdS, CdTe, HgTe, PbS, PbSe, PbTe, SnTe, $Cu_2O$, $FeSi_2$, CrMnSi, $Mg_2Si$, $RuSi_3$, $Ir_3Si_5$ or semi-metals such as Sb, Bi, CoSi, $Co_xFe_{(100-x)}Si$, $Co_xNi_{(100-x)}Si$, $Co_xMn_{(100-x)}Si$, $Co_xCr_{(100-x)}Si$, FeSi, or the like.

In yet another set of embodiments, one or more of the Cu layers in one of the aforementioned embodiments may be replaced by another metal such as Au, Ag, Cr, Al, or Mg.

A spin valve stack that includes the composite spacer layer may be sputter deposited using Ar gas in a sputtering system that is equipped with an ultra-high vacuum. In the case of a metal oxide layer such as a ZnO layer, a metal layer may be formed first by sputter depositing Zn, and then oxidizing the metal layer by a plasma oxidation, radical oxidation (ROX), or natural oxidation (NOX) method. Optionally, a metal oxide layer may be sputter deposited. After the cap layer is deposited, the CPP-GMR stack is annealed and then patterned by a conventional method to form a CPP-GMR sensor having a top surface with sidewalls. A well known fabrication sequence to complete the read head is then followed that includes forming an insulating layer adjacent to both sidewalls and forming a second magnetic shield (S2) on the cap layer. There may also be a hard bias layer formed adjacent to both sidewalls to help align the magnetic orientation within the free layer and prevent undesirable Barkhausen noise.

DETAILED DESCRIPTION OF THE INVENTION

The present invention is a CPP-GMR spin valve structure for use as a sensor in a read head of a magnetic recording device. The read head may be part of a merged read/write head. The spin valve structure is especially suited for an ultra-high magnetic recording device wherein the recording density is greater than about 200 Gbits/in$^2$. The drawings are provided by way of example and are not intended to limit the scope of the invention. Although a bottom spin valve structure is shown in the exemplary embodiment, those skilled in the art will appreciate that the composite spacer layer of the present invention may also be incorporated in a SyAP pinned layer of a top spin valve or in multilayer spin valves.

Those skilled in the art should understand that for conventional CPP-GMR heads, a Cu spacer is used either as a full film layer in a metal CPP design or as a confined metal path in a CCP-CPP scheme. Since the resistance of Cu is very small, the CPP dR/R is shunted away to a small value in the metal CPP design. In a CCP-CPP scheme, the Cu metal path is limited through an insulator template such as $Al_2O_3$ or MgO so that the delta RA can be enhanced quite significantly. Although dR/R can be improved through this current confinement, we observed a uniformity problem originating from the non-uniform Cu metal path due to plasma ion treatment (PIT) and ion assisted oxidation (IAO) processes employed during spacer fabrication. These methods are described in Headway application HT05-015 which is herein included by reference in its entirety. Furthermore, as the dimension of the Cu metal path is so small in the CCP-CPP scheme, the current density would inevitably be large and may lead to a severe EM problem. Therefore, we were motivated to discover a new full film layer approach in order to overcome the limitations associated with prior art spacer architecture.

Figure 1:
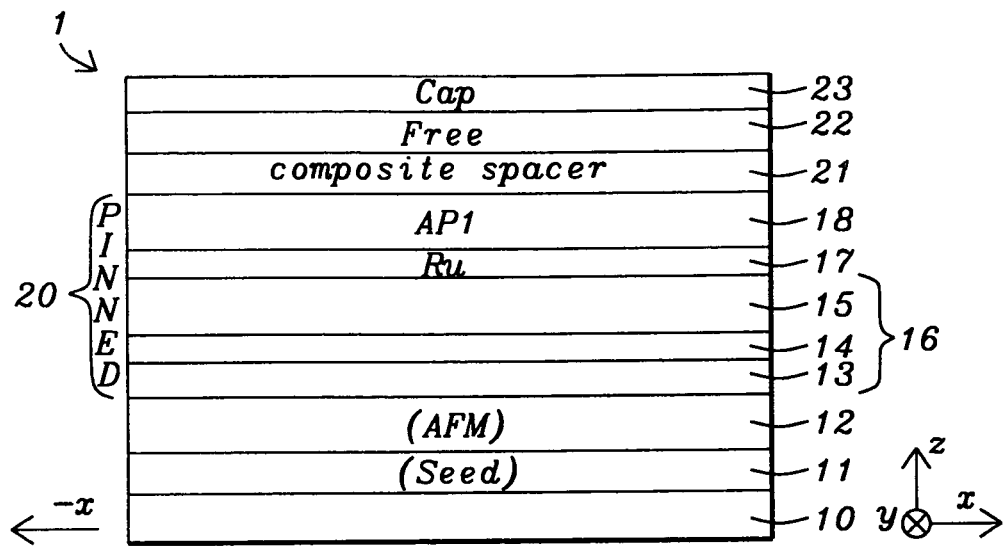
FIG. 1 is a cross-sectional view showing a CPP-GMR spin valve structure according to one embodiment of the present invention.

A first embodiment of the present invention is depicted in FIG. 1 in which a CPP-GMR sensor comprised of a bottom spin valve structure is illustrated. The view in FIG. 1 is from a cross-section along an ABS (air bearing surface) plane in a read head. The inventors have surprisingly discovered that the composite spacer layer described herein provides a significant increase in the MR ratio while maintaining acceptable EM performance.

Referring to FIG. 1, a substrate 10 is shown that is typically a first magnetic shield (S1) in a read head. For example, the substrate 10 may be comprised of a 2 micron thick layer of an electroplated permalloy (NiFe). It should be understood that the first magnetic shield may be disposed on a substructure (not shown) such as AlTiC. Moreover, there may be a gap layer (not shown) made of $Al_2O_3$, for example, formed as the top layer in the substrate 10. In a preferred embodiment, there is a seed layer 11 that may be comprised of a lower Ta layer (not shown) having a thickness from 10 to 60 Angstroms and preferably about 50 Angstroms thick, and an upper Ru layer having a thickness about 5 to 40 Angstroms thick and preferably 20 Angstroms thick formed on the substrate 10. However, other seed layers known in the art may be employed. The seed layer 11 promotes a smooth and uniform crystal structure in the overlying layers that enhances the MR ratio in the spin valve structure 1.

An AFM layer 12 is formed on the seed layer 11 and is preferably comprised of IrMn having a composition of about 18 to 22 atomic % Ir and a thickness of about 50 to 75 Angstroms. Alternatively, the AFM layer 12 may be made of MnPt having a composition between about 55 to 65 atomic % manganese and with a thickness of about 125 to 175 Angstroms. Those skilled in the art will appreciate that other materials such as NiMn, OsMn, RuMn, RhMn, PdMn, RuRhMn, or PtPdMn may also be employed as the AFM layer 12 which is used to pin the magnetization direction of the AP2 layer 16 in the overlying ferromagnetic (pinned) layer 20.

In the exemplary embodiment, a synthetic anti-parallel (SyAP) pinned layer 20 is formed on the AFM layer 12 and is preferably comprised of an AP2/Ru/AP1 configuration wherein the Ru layer is a coupling layer 17. The AP2 layer 16 preferably has a face centered cubic (FCC) trilayer orientation having a lower layer 13, a middle layer 14, and an upper layer 15, and a composition represented by $Co_ZFe_{(100-Z)}$/$Co_YFe_{(100-Y)}$/$Co_ZFe_{(100-Z)}$ where y is 0 to 60 atomic %, and z is 75 to 100 atomic %. The aforementioned FCC trilayer composition was previously described in Headway application HT05-038 which is herein included by reference in its entirety. Optionally, the $Co_YFe_{(100-Y)}$ middle layer 14 in the AP2 layer 16 may be replaced by an Fe rich alloy such as FeCr, FeV, FeW, FeZr, FeNb, FeHf, FeMo, or the like. An Fe rich alloy is defined as an alloy having an Fe content of about 70 atomic % or greater. In the $Co_ZFe_{(100-Z)}$ upper and lower layers 13, 15 of AP2 layer 16, z is preferably 90 atomic % since it is well known that $Co_{90}Fe_{10}$ easily forms a FCC structure. We have found that when a $Co_{90}Fe_{10}$ layer is grown on a seed/AFM stack comprised of Ta/Ru/IrMn, the CoFe [111] planes are exposed to the interfaces with the AFM layer 16 and coupling layer 17. Since the [111] planes are the closest packed planes for FCC structures, [111] planes should result in lower electron migration (EM) than other types of planes.

The terminology "FCC trilayer" used in the present invention means that the major component of the AP2 layer is an FCC material, preferably $Co_{90}Fe_{10}$, which may be employed as the lower layer and upper layer in the AP2 trilayer 16 with an iron rich alloy inserted as a middle layer 14. Note that the middle layer 14 may not be a face centered cubic material. The lower layer 13 with a thickness from about 6 to 15 Angstroms is preferably thinner than the upper layer 15 which is 10 to 50 Angstroms thick. In conventional AP2/coupling/AP1 configurations, the AP2 layer is thinner than the AP1 layer. In this case, AP2 trilayer 16 thickness may be greater than the AP1 layer 18 thickness to provide an asymmetry mean adjustment for the transfer curve of the real device. Furthermore, the lower layer 13 is thinner than the upper layer 15 to enhance the exchange coupling strength with the AFM layer 12. The Fe rich middle layer 14 in the AP2 trilayer 16 is 5 to 20 Angstroms thick and also serves to enhance the exchange coupling strength of the FCC AP2 trilayer 16 with the AFM layer 12. The AP2 trilayer 16 is believed to have an advantage over prior art AP2 single layers made of $Co_{75}Fe_{25}$ or $Co_{50}Fe_{50}$ because the AP2 trilayer 16 has a similar exchange coupling strength as a single $Co_{75}Fe_{25}$ or $Co_{50}Fe_{50}$ AP2 layer but its FCC structure provides a substantial EM improvement.

The magnetic moment of the AP2 trilayer 16 is pinned in a direction anti-parallel to the magnetic moment of the AP1 layer 18. For example, the AP2 trilayer may have a magnetic moment oriented along the "+x" direction while the AP1 layer has a magnetic moment in the "−x" direction. Note that all of the layers 13, 14, 15 in the AP2 trilayer 16 have a magnetic moment in the same direction. The AP2 trilayer 16 has a different thickness than the AP1 layer 18 to produce a small net magnetic moment for the pinned layer 20. Exchange coupling between the AP2 trilayer 16 and the AP1 layer 18 is facilitated by a coupling layer 17 that is preferably comprised of Ru with a thickness of about 7.5 Angstroms. Optionally, Rh or Ir may be employed as the coupling layer 17.

The AP1 layer 18 may be a composite with a $[CoFe/Cu]_k$/CoFe configuration wherein k=1, 2, or 3. In an embodiment where k=1, the AP1 layer 18 is comprised of a stack wherein the first and third layers (not shown) are made of CoFe with a Fe content of 50 to 90 atomic % and a thickness between 10 and 20 Angstroms, and preferably 18 Angstroms, and the second (middle) layer is made of Cu with a thickness of 0.5 to 4 Angstroms and preferably 2 Angstroms. Preferably, the CoFe layers in a composite AP1 layer 18 have the same $Co_ZFe_{(100-Z)}$ composition as the lower layer 13 and upper layer 15 in the AP2 layer 16. The use of a laminated AP1 layer to improve CPP-GMR properties is well known in the art. All of the CoFe and Cu layers in the AP1 layer 18 have a magnetic moment in the "−x" direction when the AP1 layer has a magnetic moment along the "−x" axis in the exemplary embodiment.

A key feature of the present invention is a composite spacer 21 having at least one layer of a metal M and at least one layer of S which is a semiconductor material or a semi-metal in a M/S, S/M, M/S/M, S/M/S, M/S/M/S/M, or a $(M/S/M)_n$ configuration.

In a first series of embodiments, the metal M is made of Cu and the semiconductor material S is comprised of ZnO. For example, in one embodiment, the composite spacer 21 may have a Cu/ZnO or ZnO/Cu configuration. A second embodiment of the present invention encompasses a composite spacer layer 21 having a plurality of layers where M and S are alternating as in Cu/ZnO/Cu, ZnO/Cu/ZnO, or Cu/ZnO/Cu/ZnO/Cu. A third embodiment encompasses a multilayer format where the composite spacer layer 21 has a $(M/S/M)_n$ configuration where n is an integer≥1, M is Cu, and S is ZnO. Copper layers in the first series of embodiments have a thickness from about 0.5 to 50 Angstroms and the ZnO layers have a thickness between about 1 and 50 Angstroms.

In a second series of embodiments, Cu as the M component in the composite spacer layer 21 is replaced by a metal which is Ag, Au, Cr, Al, or Mg with a thickness from about 0.5 to 50 Angstroms. The composite spacer layer 21 may have a M/S, S/M, M/S/M, S/M/S, M/S/M/S/M, or a $(M/S/M)_n$ configuration where n is an integer≥1, M is one of the aforementioned metals, and S is a semiconductor material or a semi-metal.

In a third series of embodiments, the composite spacer layer 21 may have a M/S, S/M, M/S/M, S/M/S, M/S/M/S/M, or a $(M/S/M)_n$ configuration where n is an integer≥1, M is a metal and S is a semiconductor material comprised of MgO, $Zn_xMg_{(100-X)}O$ where x is from 0 to 99 atomic %, ZnCuO, ZnCdO, ZnAlO, ZnSe, ZnTe, Si, Ge, $TiO_2$, AlN, GaN, InN, AlP, AlAs, AlSb, GaP, GaAs, GaSb, InP, InAs, ZnS, CdS, CdTe, HgTe, PbS, PbSe, PbTe, SnTe, $Cu_2O$, $FeSi_2$, CrMnSi, Mg$_2$Si, RuSi$_3$, Ir$_3$Si$_5$, or is a semi-metal such as Sb, Bi, CoSi, Co$_X$Fe$_{(100-X)}$Si, Co$_X$Ni$_{(100-X)}$Si, Co$_X$Mn$_{(100-X)}$Si, Co$_X$Cr$_{(100-X)}$Si, FeSi, or the like.

Optionally, the one or more S layers in the composite spacer layer 21 may be doped with one or more dopants comprised of Si, B, Mg, Mn, Al, Cu, Cd, Cr, Ti, Zr, Hf, Ru, Mo, Nb, Co, Fe, Ni, or the like having a concentration of from about 0 to 20 atomic %. The one or more dopants may be introduced by sputtering a target that already has the dopant in the semiconductor or semi-metal. Optionally, the dopant may be a second target and can be co-sputtered with the semiconductor or semi-metal material. The reason for performance enhancement by way of doping is not completely understood but is believed to be related to the control of grain boundaries in the semiconductor or semi-metal (S) layer.

There is a free layer 22 formed on the composite spacer 21. The free layer 22 may be a composite having a lower FeCo layer about 5 to 30 Angstroms thick and an upper NiFe layer (not shown) with a thickness of from 10 to 60 Angstroms. In one aspect, as disclosed in Headway application HT05-015, the lower FeCo layer has a composition represented by Fe$_V$Co$_{(100-V)}$ wherein v ranges from about 20 to 70 atomic % and the upper NiFe layer has a composition represented by Ni$_W$Fe$_{(100-W)}$ wherein w ranges from 85 to 100 atomic %. In an alternative embodiment, a CoFeB layer is inserted between the lower FeCo layer and the upper NiFe layer to give a free layer 22 having a trilayer configuration. The magnetic moment of the free layer 22 is preferably aligned along the y-axis in a quiescent state and can rotate to a magnetic direction along the x-axis under an appropriately sized applied magnetic field such as when the spin valve structure 1 is moved along the ABS plane over a magnetic disk in the z-direction.

The top layer in the spin valve stack is a cap layer 23 that in one embodiment has a Cu/Ru/Ta/Ru configuration in which the Cu layer has a thickness of 10 to 40 Angstroms, the lower Ru layer has a thickness of 10 to 30 Angstroms, the Ta layer is 40 to 80 Angstroms thick, and the upper Ru layer is 10 to 30 Angstroms thick. Optionally, other cap layer materials used in the art may be employed as the cap layer 23.

Figure 2:
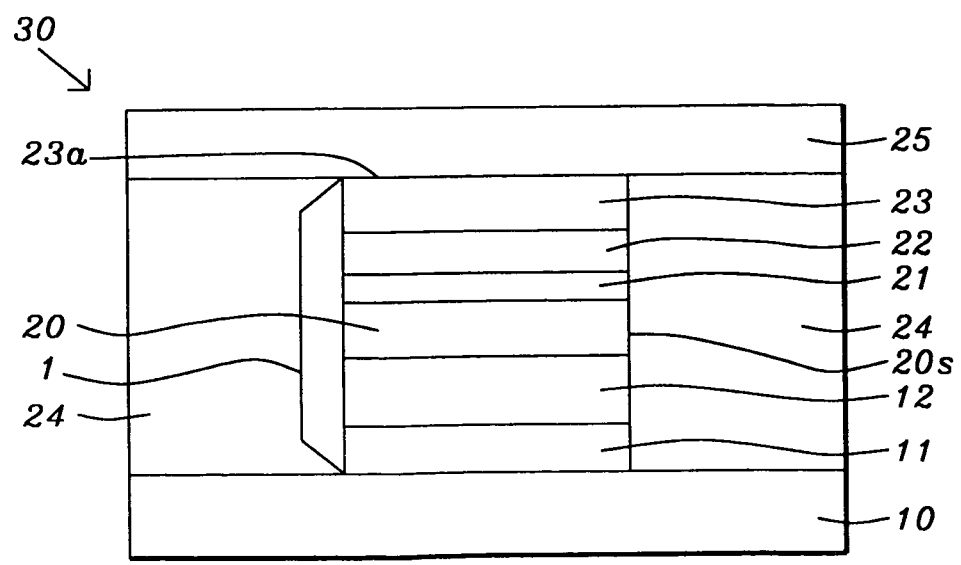
FIG. 2 is a cross-sectional view of a CPP-GMR read head showing the spin valve structure of the present invention formed between a first shield and a second shield.

Referring to FIG. 2, a method of fabricating a magnetic read head 30 that includes the spin valve structure 1 from FIG. 1 will now be described. A substrate 10 is provided as mentioned previously and may be a first magnetic shield (S1) formed by a conventional method in the read head 30. The spin valve stack described previously is laid down by a process in which the seed layer 11, AFM layer 12, pinned layer 20, composite spacer 21, free layer 22, and cap layer 23 are sequentially formed on the substrate 10. A DC magnetron sputter system such as one available from Anelva may be employed that is capable of a base pressure of at least 1×10$^{-8}$ torr and preferably less than 5×10$^{-9}$ torr. A low base pressure allows films to be sputter deposited with higher uniformity and reproducibility. It should be understood that a sputter chamber may have multiple targets which are low pressure discharge cathodes. The sputter gas is preferably Ar. All of the sputter deposited films may be laid down in the same sputter chamber or in different sputter chambers within the same mainframe. For example, the seed layer 11, AFM layer 12, pinned layer 20, and lower M layer (not shown) in the composite spacer layer 21 may all be deposited in the same sputter chamber.

In an embodiment wherein the S layer is comprised of a metal oxide as in ZnO, the metal component (Zn) may be initially deposited as a film and then oxidized by a radical oxidation (ROX), natural oxidation (NOX), or plasma oxidation process in an oxidation chamber within the sputter deposition system to yield the ZnO layer. Alternatively, when S is an oxide that has a ternary composition represented by ABO where A and B are metals as in ZnCuO, then the AB alloy is deposited first and is oxidized by a ROX, NOX, or plasma oxidation process to form an ABO layer. Optionally, a metal oxide including an ABO type may be deposited by sputtering a target made of the same composition. Formation of a MgO layer by a plasma oxidation of a Mg layer is described by R. Dave in "MgO-based tunnel junction material for high speed Toggle MRAM", IEEE Trans. Magn., V 42, P. 1935-39 (2006).

After all of the layers in the spin valve stack are laid down on the substrate 10, an annealing step may be performed by applying a 10000 Oersted magnetic field along a certain axis for 5 hours at about 280° C. Thereafter, the spin valve stack is patterned and etched by a well known process that employs a photoresist layer (not shown) and an ion beam etch (IBE) or reactive ion etch (RIE) method, for example. Following the etch step, a spin valve structure having a top surface 23a and sidewalls 20s is defined. An insulating layer 24 is typically deposited to a depth that covers the sidewalls 20s. There may also be a biasing layer (not shown) that is formed within the insulating layer 24 proximate to each side of the spin valve structure to provide longitudinal biasing to the free layer as appreciated by those skilled in the art. The photoresist layer is then removed by a lift-off process and the insulating layer 24 may be smoothed by a planarization technique such as a chemical mechanical polish (CMP) method to become coplanar with the top surface 23a.

The remainder of the read head 30 may then be fabricated by a conventional process. For example, a second magnetic shield 25 may be formed on the top surface 23a and over the insulating layer 24. Those skilled in the art will appreciate that in a CPP spin valve structure, the second magnetic shield (S2) 25 is also used as the top conductor lead layer. The first magnetic shield (S1) 10 serves as the bottom conductor lead layer.

To demonstrate the improved performance achieved by incorporating a composite spacer layer according to the present invention in a spin valve structure, a series of CPP-GMR devices were fabricated and tested. Previously, the inventors have manufactured similar CPP-GMR devices except with a conventional Cu spacer and realized a dR/R of between 1.5% and 2% and a RA of 0.05 ohm-um$^2$.

EXAMPLE 1

A bottom spin valve structure was formed having a composition represented by Ta10/Ru10/IrMn70/Fe$_{10}$Co$_{90}$10/Fe$_{70}$Co$_{30}$14/Fe$_{10}$Co$_{90}$20/Ru7.5/Fe$_{70}$Co$_{30}$15/Cu2/Fe$_{70}$Co$_{30}$15/Cu3/ZnO15/Cu3/Fe$_{70}$Co$_{30}$8/CoFeB12/Ni$_{90}$Fe$_{10}$60/Cu30/Ru10/Ta60/Ru30. Each value next to the individual layer indicates the film thickness in Angstroms. In the above structure; the following layers are formed successively on the substrate: seed layer (Ta/Ru); AFM layer (IrMn); AP2 (Fe$_{10}$Co$_{90}$/Fe$_{70}$Co$_{30}$/Fe$_{10}$Co$_{90}$); Ru coupling layer, AP1 (Fe$_{70}$Co$_{30}$/Cu/Fe$_{70}$Co$_{30}$); composite spacer (Cu/ZnO/Cu); free layer (Fe$_{70}$Co$_{30}$/CoFeB/Ni$_{90}$Fe$_{10}$), and capping layer (Cu/Ru/Ta/Ru). A dR/R=10.0% and a RA=0.092 ohm-um$^2$ was measured for this device which is a substantial improvement over prior art CPP-GMR devices having a full film CPP design. This example represents an embodiment where the composite spacer layer has a M/S/M configuration in which M is Cu and S is ZnO.

EXAMPLE 2

A bottom spin valve structure was formed having a composition represented by Ta10/Ru10/IrMn70/Fe$_{10}$Co$_{90}$10/

$Fe_{70}Co_{30}14/Fe_{10}Co_{90}20/Ru7.5/Fe_{70}Co_{30}15/Cu2/Fe_{70}Co_{30}15/ZnO8/Cu2/ZnO8/Fe_{70}Co_{30}8/CoFeB12/Ni_{90}Fe_{10}60/Cu30/Ru10/Ta60/Ru30$. This example represents an embodiment where the composite spacer layer has a S/M/S configuration in which M is Cu and S is ZnO. A dR/R=17.0% and a RA=0.342 ohm-um$^2$ was measured for this device which is a substantial improvement over prior art CPP-GMR devices having a full film CPP design.

EXAMPLE 3

A bottom spin valve structure was formed having a composition represented by $Ta10/Ru10/IrMn70/Fe_{10}Co_{90}10/Fe_{70}Co_{30}14/Fe_{10}Co_{90}20/Ru7.5/Fe_{70}Co_{30}15/Cu2/Fe_{70}Co_{30}5/Cu2/ZnO8/Cu2/ZnO8/Cu2/Fe_{70}Co_{30}8/CoFeB12/Ni_{90}Fe_{10}60/Cu30/Ru10/Ta60/Ru30$. This example represents an embodiment where the composite spacer layer has a M/S/M/S/M configuration in which M is Cu and S is ZnO. Values for dR/R and RA have not been measured yet but an improvement is anticipated over spin valve structures comprised of a conventional Cu spacer layer based on the results from the first two examples.

EXAMPLE 4

A bottom spin valve structure was formed having a composition represented by $Ta10/Ru10/IrMn70/Fe_{10}Co_{90}10/Fe_{70}Co_{30}14/Fe_{10}Co_{90}20/Ru7.5/Fe_{70}Co_{30}15/Cu2/Fe_{70}Co_{30}5/Cu5/ZnO15/Fe_{70}Co_{30}8/CoFeB12/Ni_{90}Fe_{10}60/Cu30/Ru10/Ta60/Ru30$. This example represents an embodiment where the composite spacer layer has a M/S configuration in which M is Cu and S is ZnO. Values for dR/R and RA have not been measured yet but an improvement is anticipated over spin valve structures comprised of a conventional Cu spacer layer based on the results from the first two examples.

EXAMPLE 5

A bottom spin valve structure was formed having a composition represented by $Ta10/Ru10/IrMn70/Fe_{10}Co_{90}10/Fe_{70}Co_{30}14/Fe_{10}Co_{90}20/Ru7.5/Fe_{70}Co_{30}15/Cu2/Fe_{70}Co_{30}5/ZnO15/Cu5/Fe_{70}Co_{30}8/CoFeB12/Ni_{90}Fe_{10}60/Cu30/Ru10/Ta60/Ru30$. This example represents an embodiment where the composite spacer layer has a S/M configuration in which M is Cu and S is ZnO. Values for dR/R and RA have not been measured yet but an improvement is anticipated over spin valve structures comprised of a conventional Cu spacer layer based on the results from the first two examples.

Although the inventors are not bound by any particular theory, the mechanism for the improved dR/R results from the composite spacer layer of the present invention is believed to be related to a current confinement through the grain boundaries of a semiconductor such as ZnO that forms "conductive channels". Such conductive channels are located and isolated among the insulating grains. The conductive channels act like confined current channels that carry spin polarized current through the Cu or M layer. Thus, a magnetoresistive (MR) effect is achieved. The mechanism is similar to the current confining effect except in this case, it involves conductive channels through semiconductor (or semi-metal) grain boundaries.

The CPP-GMR spin valve structure disclosed herein provides an advantage over conventional CPP designs in that the dR/R response is substantially improved through a unique composite spin layer while maintaining a low RA value and acceptable EM performance because of an AP2 FCC trilayer configuration.

While this invention has been particularly shown and described with reference to, the preferred embodiment thereof, it will be understood by those skilled in the art that various changes in form and details may be made without departing from the spirit and scope of this invention.

We claim:
1. A method of forming a spin valve structure in a magnetic read head comprising:
(a) providing a substrate; and
(b) sequentially forming a seed layer, AFM layer, pinned layer having an AP2/coupling/AP1 configuration, a composite spacer having at least one metal (M) layer and at least one semiconductor or semi-metal (S) layer, a free layer, and a capping layer on the substrate, the composite spacer has a M/S, S/M, M/S/M, S/M/S, M/S/M/S/M, or a (M/S/M)$_n$ configuration where n is an integer>1 and wherein M is Cu, and S is ZnO, a ZnO layer is formed by a process wherein a Zn layer is deposited and then oxidized, or by sputter deposition of a ZnO layer.

2. The method of claim 1 wherein the spin valve structure has a CPP-GMR design and all of the layers therein are formed in a sputter deposition tool.

3. The method of claim 1 wherein a thickness of the at least one M layer is about 1 to 50 Angstroms and a thickness of the at least one S layer is from about 1 to 50 Angstroms.

4. The method of claim 1 wherein oxidation of a Zn layer is accomplished by a radical oxidation, natural oxidation, or plasma oxidation process.

5. A method of forming a spin valve structure in a magnetic read head comprising:
(a) providing a substrate; and
(b) sequentially forming a seed layer, AFM layer, pinned layer having an AP2/coupling/AP1 configuration, a composite spacer having at least one metal (M) layer and at least one semiconductor or semi-metal (S) layer, a free layer, and a capping layer on the substrate, the composite spacer has a M/S, S/M, M/S/M, S/M/S, M/S/M/S/M, or a (M/S/M)$_n$ configuration where the at least one M layer and the at least one S layer are successively laid down in alternating fashion with either a bottommost M layer or bottommost S layer, and where n is an integer>1 and wherein S is a semiconductor material comprised of ZnO, MgO, $Zn_xMg_{(100-x)}O$ where x is from 0 to 99 atomic %, ZnCuO, ZnCdO, ZnAlO, ZnSe, ZnTe, Si, Ge, TiO$_2$, AlN, GaN, InN, AlP, AlAs, AlSb, GaP, GaAs, GaSb, InP, InAs, ZnS, CdS, CdTe, HgTe, PbS, PbSe, PbTe, SnTe, Cu$_2$O, FeSi$_2$, CrMnSi, Mg$_2$Si, RuSi$_3$, Ir$_3$Si$_5$ or is a semi-metal such as Sb, Bi, CoSi, $Co_xFe_{(100-x)}Si$, $Co_xNi_{(100-x)}Si$, $Co_xMn_{(100-x)}Si$, $Co_xCr_{(100-x)}Si$, or FeSi, and M is Ag, Au, Cr, Al, or Mg, and wherein a ZnO, MgO, ZnMgO, ZnCuO, ZnCdO, ZnAlO, TiO$_2$, or Cu$_2$O layer is formed by a process wherein a metal or alloy layer is deposited and then oxidized, or by sputter deposition of the metal oxide or alloy oxide layer.

6. The method of claim 5 wherein the at least one S layer is a metal oxide or a ternary oxide (ABO) where A and B are metals, and said at least one S layer is formed by first sputter depositing a metal layer or AB layer and then oxidizing the metal or AB layer by a plasma oxidation, natural oxidation, or radical oxidation process in an oxidation chamber within the sputter deposition tool.

7. The method of claim 5 wherein the at least one metal (M) layer has a thickness from about 0.5 to 50 Angstroms.

8. A method of forming a spin valve structure in a magnetic read head comprising:
(a) providing a substrate; and
(b) sequentially forming a seed layer, AFM layer, pinned layer having an AP2/coupling/AP1 configuration, a composite spacer having at least one metal (M) layer and at least one semiconductor or semi-metal (S) layer, a free layer, and a capping layer on the substrate, the composite spacer has a M/S, S/M, M/S/M, S/M/S, M/S/M/S/M, or a $(M/S/M)_n$ configuration where n is an integer>1 and wherein S is a semiconductor material comprised of ZnO, MgO, $Zn_xMg_{100-x}O$ where x is from 0 to 99 atomic %, ZnCuO, ZnCdO, ZnAlO, ZnSe, ZnTe, Si, Ge, $TiO_2$, AlN, GaN, InN, AlP, AlAs, AlSb, GaP, GaAs, GaSb, InP, InAs, ZnS, CdS, CdTe, HgTe, PbS, PbSe, PbTe, SnTe, $Cu_2O$, $FeSi_2$, CrMnSi, $Mg_2Si$, $RuSi_3$, $Ir_3Si_5$, or is a semi-metal such as Sb, Bi, CoSi, $Co_xFe_{(100-x)}Si$, $Co_xNi_{(100-x)}Si$, $Co_xMn_{(100-x)}Si$, $Co_xCr_{(100-x)}Si$, or FeSi, and M is Ag, Au, Cr, Al, or Mg, and wherein the at least one S layer is doped with one or more of Si, B, Mg, Mn, Al, Cu, Cd, Cr, Ti, Zr, Hf, Ru, Mo, Nb, Co, Fe, Ni having a concentration of about 0 to 20 atomic % in the resulting doped film, said dopant is introduced into the at least one S layer by a sputtering method or by sputtering a target comprised of the at least one S layer material and the dopant.

9. A method of forming a spin valve structure in a magnetic read head comprising:
(a) providing a substrate; and
(b) sequentially forming a composite seed layer with a lower Ta layer and an upper Ru layer, an AFM layer comprised of IrMn, a pinned layer having an AP2/coupling/AP1 configuration wherein the AP2 layer has a composition represented by $Co_zFe_{(100-z)}/Co_yFe_{(100-y)}/Co_zFe_{(100-z)}$ where y is from 0 to about 60 atomic %, and z is about 75 to 100 atomic %, the coupling layer is Ru, and wherein the AP1 layer is a laminated structure which is represented by a $[CoFe/Cu]_k/CoFe$ configuration wherein k=1, 2, or 3, a composite spacer having at least one metal (M) layer and at least one semiconductor or semi-metal (S) layer, a free layer, and a capping layer on the substrate, the composite spacer has a M/S, S/M, M/S/M, S/M/S, M/S/M/S/M, or a $(M/S/M)_n$ configuration where n is an integer>1 and wherein S is a semiconductor material comprised of ZnO, MgO, $Zn_xMg_{(100-x)}O$ where x is from 0 to 99 atomic %, ZnCuO, ZnCdO, ZnAlO, ZnSe, ZnTe, Si, Ge, $TiO_2$, AlN, GaN, InN, AlP, AlAs, AlSb, GaP, GaAs, GaSb, InP, InAs, ZnS, CdS, CdTe, HgTe, PbS, PbSe, PbTe, SnTe, $Cu_2O$, $FeSi_2$, CrMnSi, $Mg_2Si$, $RuSi_3$, $Ir_3Si_5$, or is a semi-metal such as Sb, Bi, CoSi, $Co_xFe_{(100-x)}Si$, $Co_xNi_{(100-x)}Si$, $Co_xMn_{(100-x)}Si$, $Co_xCr_{(100-x)}Si$, or FeSi, and M is Ag, Au, Cr, Al, or Mg.

* * * * *